United States Patent
Barker et al.

(10) Patent No.: US 11,187,100 B2
(45) Date of Patent: Nov. 30, 2021

(54) CMC HONEYCOMB BASE FOR ABRADABLE COATING ON CMC BOAS

(71) Applicant: United Technologies Corporation, Farmington, CT (US)

(72) Inventors: William M. Barker, North Andover, MA (US); Thomas E. Clark, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 306 days.

(21) Appl. No.: 16/207,918

(22) Filed: Dec. 3, 2018

(65) Prior Publication Data
US 2020/0173299 A1 Jun. 4, 2020

(51) Int. Cl.
*F01D 11/12* (2006.01)
*C04B 38/00* (2006.01)

(52) U.S. Cl.
CPC ........ *F01D 11/122* (2013.01); *C04B 38/0006* (2013.01); *F05D 2230/90* (2013.01); *F05D 2240/11* (2013.01); *F05D 2250/132* (2013.01); *F05D 2250/283* (2013.01); *F05D 2300/6033* (2013.01); *F05D 2300/611* (2013.01)

(58) Field of Classification Search
CPC .... F01D 11/122; F01D 11/125; F01D 11/127; F01D 11/12; C04B 38/0006
See application file for complete search history.

(56) References Cited

U.S. PATENT DOCUMENTS

| | | | |
|---|---|---|---|
| 6,615,950 B2 | 9/2003 | Porte et al. | |
| 7,819,625 B2 | 10/2010 | Merrill et al. | |
| 7,892,630 B1 | 2/2011 | McKnight et al. | |
| 2009/0096138 A1* | 4/2009 | Meier | B22F 3/225 264/630 |
| 2016/0032774 A1* | 2/2016 | Strock | C23C 28/3455 415/200 |
| 2016/0040551 A1* | 2/2016 | Strock | F01D 25/007 427/197 |
| 2016/0123160 A1 | 5/2016 | Strock et al. | |
| 2016/0251970 A1 | 9/2016 | Strock et al. | |
| 2018/0066527 A1* | 3/2018 | Kadau | F01D 5/186 |
| 2018/0013544 A1 | 5/2018 | Hudson | |
| 2018/0135435 A1 | 5/2018 | Propheter-Hinckley | |
| 2018/0135438 A1 | 5/2018 | Hudson et al. | |
| 2018/0135439 A1 | 5/2018 | Devore et al. | |
| 2019/0292931 A1* | 9/2019 | Landwehr | C04B 35/18 |

FOREIGN PATENT DOCUMENTS

| | | |
|---|---|---|
| EP | 2325347 | 5/2011 |
| WO | 2011085376 | 7/2011 |

OTHER PUBLICATIONS

Jack Sain, "Advisory Circular Turbine Engine Rotor Blade Containment/Durability", Jun. 18, 1990, Federal Aviation Administration. (Year: 1990).*
EP Search Report for EP Application No. 19213267.8 dated Apr. 24, 2020.

* cited by examiner

*Primary Examiner* — David Hamaoui
*Assistant Examiner* — Michael K. Reitz
(74) *Attorney, Agent, or Firm* — Carlson, Gaskey & Olds, P.C.

(57) ABSTRACT

A method of forming a blade outer air seal includes applying a cavity layer that has a plurality of cavities to a radially inner side of a seal body. The cavity layer is coated with an abradable coating.

7 Claims, 6 Drawing Sheets

CMC HONEYCOMB BASE FOR ABRADABLE COATING ON CMC BOAS

BACKGROUND

This application relates to a blade outer air seal having a unique structure.

Gas turbine engines are known and typically include a compressor for compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

Blade outer air seals have been proposed made of ceramic matrix composite fiber layers.

SUMMARY

In one exemplary embodiment, a method of forming a blade outer air seal includes applying a cavity layer that has a plurality of cavities to a radially inner side of a seal body. The cavity layer is coated with an abradable coating.

In a further embodiment of any of the above, the seal body and cavity layer is densified before coating the cavity layer with the abradable coating.

In a further embodiment of any of the above, the cavity layer and the seal body are the same material.

In a further embodiment of any of the above, the seal body and the cavity layer are a ceramic matrix composite material.

In a further embodiment of any of the above, the cavity layer is formed as a continuous sheet and cut to size before being applied to the seal body.

In a further embodiment of any of the above, the coating is a geometrically segmented abradable coating formed from a ceramic material.

In a further embodiment of any of the above, the plurality of cavities is a plurality of hexagonal cavities.

In a further embodiment of any of the above, the cavity layer has a solidity between about 20% and about 80%.

In a further embodiment of any of the above, the plurality of cavities is a plurality of circular cavities.

In a further embodiment of any of the above, the plurality of cavities are evenly spaced over the entire cavity layer.

In a further embodiment of any of the above, the abradable coating fills each of the plurality of cavities.

In a further embodiment of any of the above, the abradable coating forms a smooth radially inner surface.

In a further embodiment of any of the above, the method does not require drilling of the radially inner side of the seal body.

In a further embodiment of any of the above, the method includes drilling the plurality of cavities into the radially inner side of the seal body.

In another exemplary embodiment, a blade outer air seal includes a blade outer air seal body that has a radially inner side and a radially outer side. The radially inner side has a cavity layer that has a plurality of cavities and an abradable coating over the cavity layer.

In a further embodiment of any of the above, the plurality of cavities is a plurality of hexagonal cavities.

In a further embodiment of any of the above, the plurality of cavities are evenly spaced over the entire cavity layer and wherein the cavity layer has a solidity between about 20% and about 80%.

In a further embodiment of any of the above, the abradable coating fills each of the plurality of cavities.

In a further embodiment of any of the above, the seal body and the cavity layer are both a ceramic matrix composite material.

In a further embodiment of any of the above, the abradable coating is a geometrically segmented abradable coating formed from a ceramic material.

These and other features may be best understood from the following drawings and specification.

DETAILED DESCRIPTION

Figure 1:
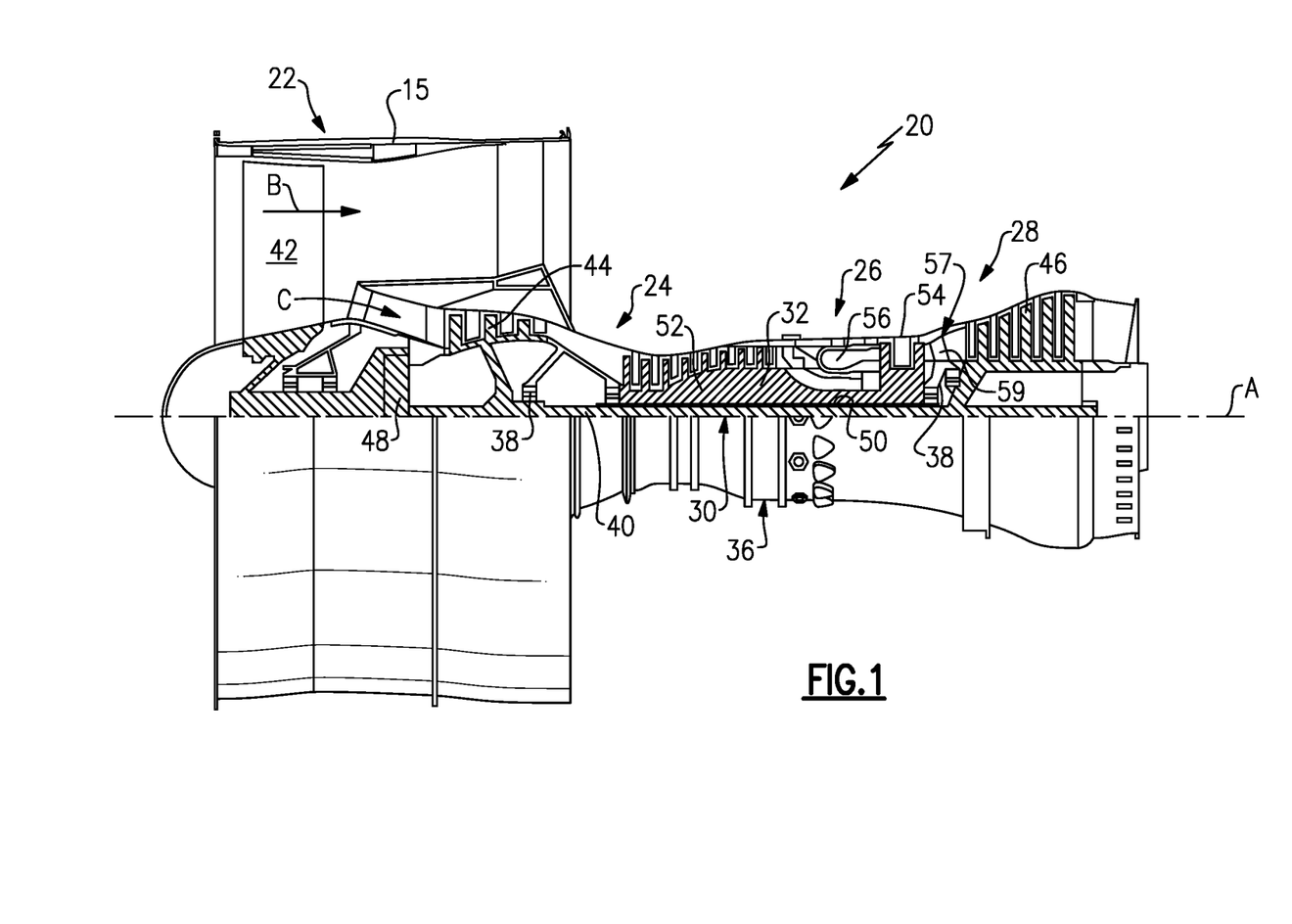
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R.)/(518.7° R.)]$^{0.5}$. The "Low corrected fan tip speed" as disclosed herein according to one non-limiting embodiment is less than about 1150 ft/second (350.5 meters/second).

Figure 2:
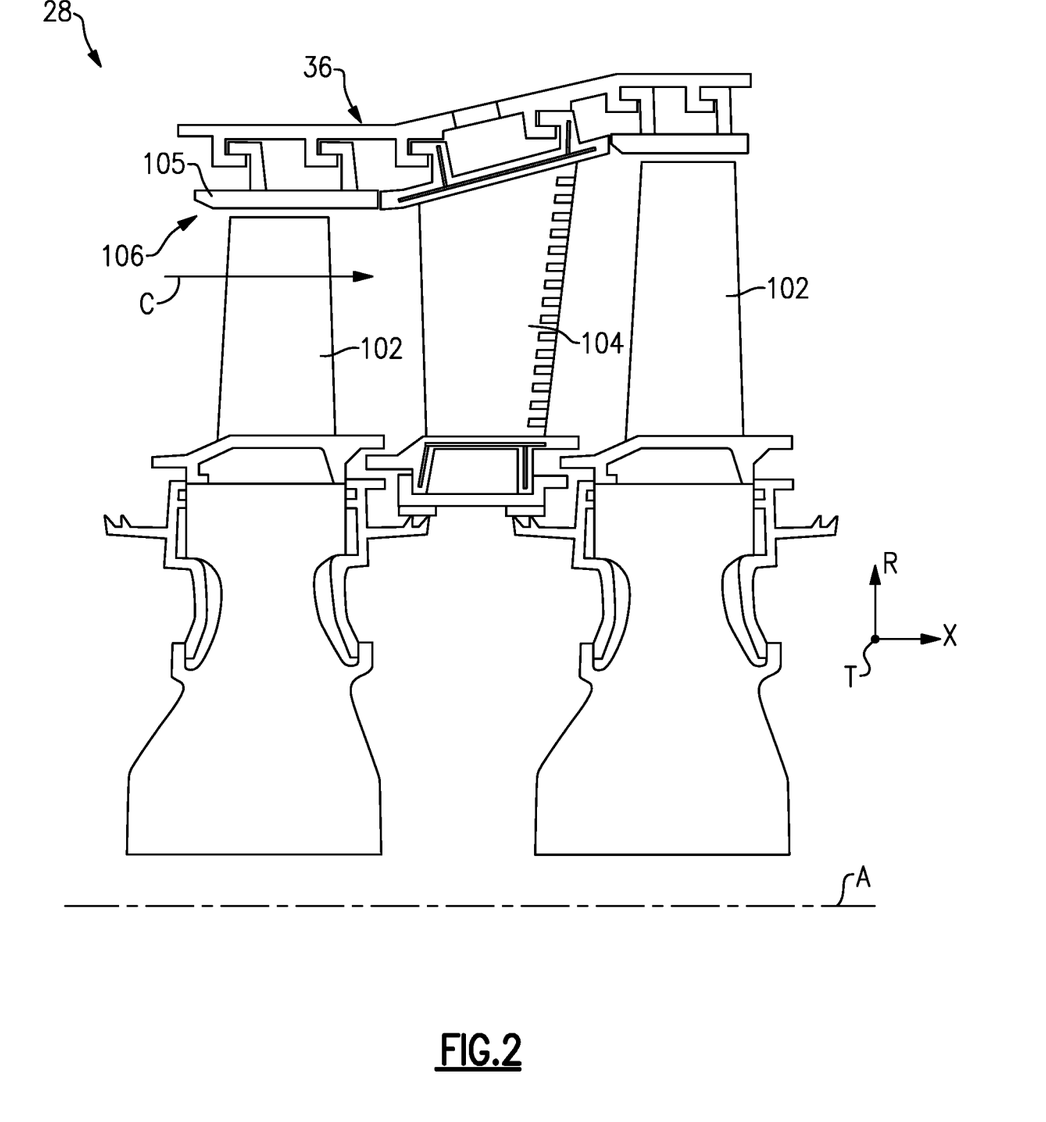
FIG. 2 schematically shows a portion of a turbine section.

FIG. 2 schematically illustrates a portion of the turbine section 28. The turbine section 28 includes alternating series of rotating blades 102 and stationary vanes 104 that extend into the core flow path C of the gas turbine engine 20. Turbine blades 102 rotate and extract energy from the hot combustion gases that are communicated along the core flow path C of the gas turbine engine 20. The turbine vanes 104, which generally do not rotate, guide the airflow and prepare it for the next set of blades 102. As is known, it is desirable to pass the bulk of products of combustion downstream of the combustor section 26 across the turbine blades 102. Thus, a blade outer air seal ("BOAS") 106 is positioned slightly radially outwardly of the outer tip of the blades 102. It should be understood that the turbine section 28 could be utilized in other gas turbine engines, and even gas turbine engines not having a fan section at all. The BOAS 106 is made up of a plurality of BOAS seal segments 105 arranged circumferentially about the axis of rotation A.

Figure 3:
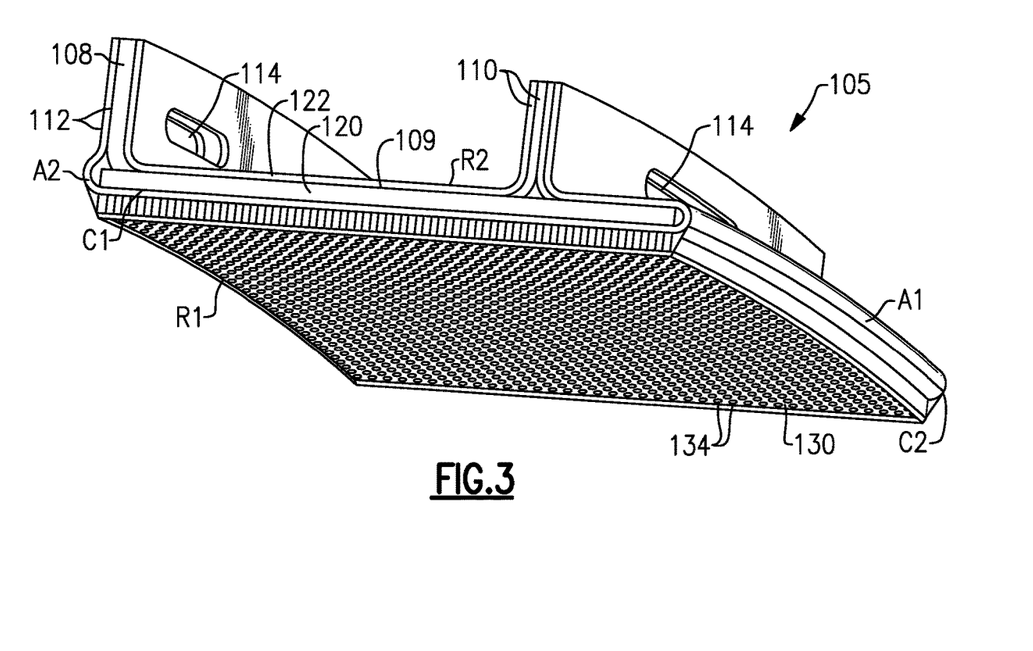
FIG. 3 shows a blade outer air seal according to exemplary embodiment.

FIG. 3 illustrates an exemplary BOAS seal segment 105. Each seal segment 105 is a body that defines radially inner and outer sides R1, R2, respectively, first and second circumferential sides C1, C2, respectively, and first and second axial sides A1, A2, respectively. The radially inner side R1 faces in a direction toward the engine central axis A. The radially inner side R1 is thus the hotwall or gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

Figure 4:
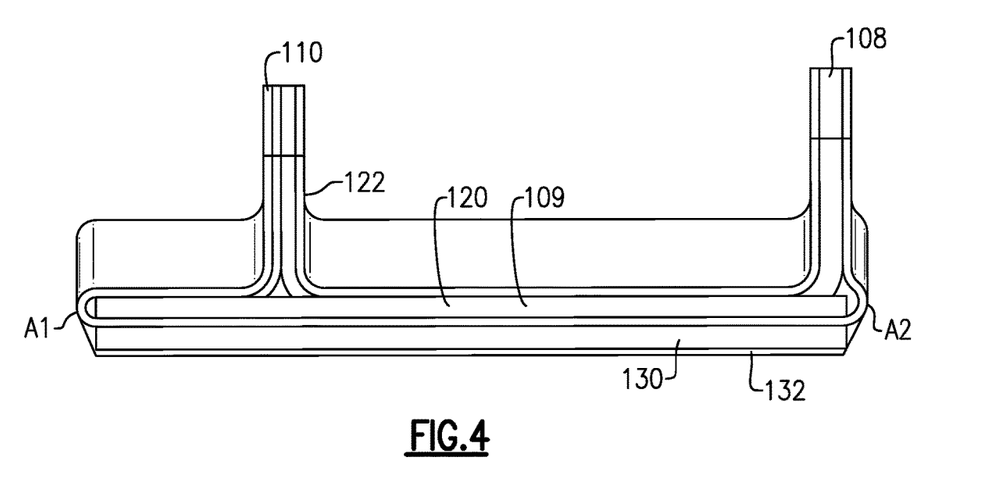
FIG. 4 shows a cross-sectional view through a blade outer air seal.

As shown in FIG. 4 and with continuing reference to FIG. 3, the BOAS seal segment 105 has attachment members 108 and 110 and a central web 109. The attachment members 108, 110 secure the BOAS seal segment 105 to an engine structure, such as the engine static structure 36. Although a particular BOAS seal segment 105 is shown, this disclosure may apply to other BOAS or attachment configurations.

In the illustrated embodiment, the BOAS seal segment 105 is formed of a ceramic matrix composite ("CMC") material. The BOAS seal segment 105 is formed of a plurality of CMC laminates 122. The laminates may be silicon carbide fibers, formed into a woven fabric in each layer. The fibers may be coated by a boron nitride.

In one embodiment, the seal segment 105 may have a central reinforcement laminate 120 including a plurality of layers. An overwrap 122 also includes a plurality of layers or laminates, and spans a central web 109 which is defined axially between radially extending attachment members 108 and 110, and may extend axially outwardly of one or both attachment members 108, 110. In the illustrated embodiment, attachment members 108, 110 extend radially from the central web and have holes 114 for attachment to the engine structure 36. In other embodiments, the attachment members 108, 110 may be hooks, for example. Other BOAS seal segments 105 and/or structures for attachment of the BOAS seal segment 105 to the engine structure 36 may be contemplated within the scope of this disclosure. In other embodiments, the BOAS seal segment 105 may be formed from a metallic material or monolithic ceramic, for example.

The seal segment 105 includes a cavity layer or honeycomb layer 130 and a geometrically segmented abradable coating ("GSAC") 132 on the radially inner side R1. An abradable coating on a BOAS seal segment 105 contacts tips of the turbine blades 102 such that the blades 102 abrade the coating upon operation of the engine 20. This provides a minimum clearance between the BOAS seal segment 105 and the tip of the blade 102. Over time, internal stresses can develop in the coating that may make the coating vulnerable to erosion and spalling. When the coating is spalling, small fragments or chips wear off the BOAS. In some known coatings, the BOAS needs to be replaced after a period of use. The use of a GSAC can help reduce this spalling. A GSAC forms segmentation cracks within the coating at corners of the underlying component upon sintering. These segmentation cracks provide locations to accommodate the strain associated with internal stresses. That is, the energy associated with the internal stresses is maintained at a lower level due to the cracks such that there is less energy available for causing delamination cracking and spallation. In one embodiment, the GSAC is a ceramic material.

The cavity layer or honeycomb layer 130 has a plurality of cavities 134 that facilitate the cracks in the GSAC 132 for spallation reduction. In an example embodiment, the cavities 134 are all the same size and shape. In an embodiment, the cavities 134 are evenly spaced from one another and span the entire honeycomb layer 130. The GSAC 132 fills each of the cavities 134, and has an additional thickness radially inward of the honeycomb layer 130. In one example, the GSAC 132 provides a generally smooth radially inner surface for the BOAS seal segment 105. That is, the GSAC 132 provides the hot wall surface immediately adjacent the tips of the turbine blades 102.

Figure 5A:
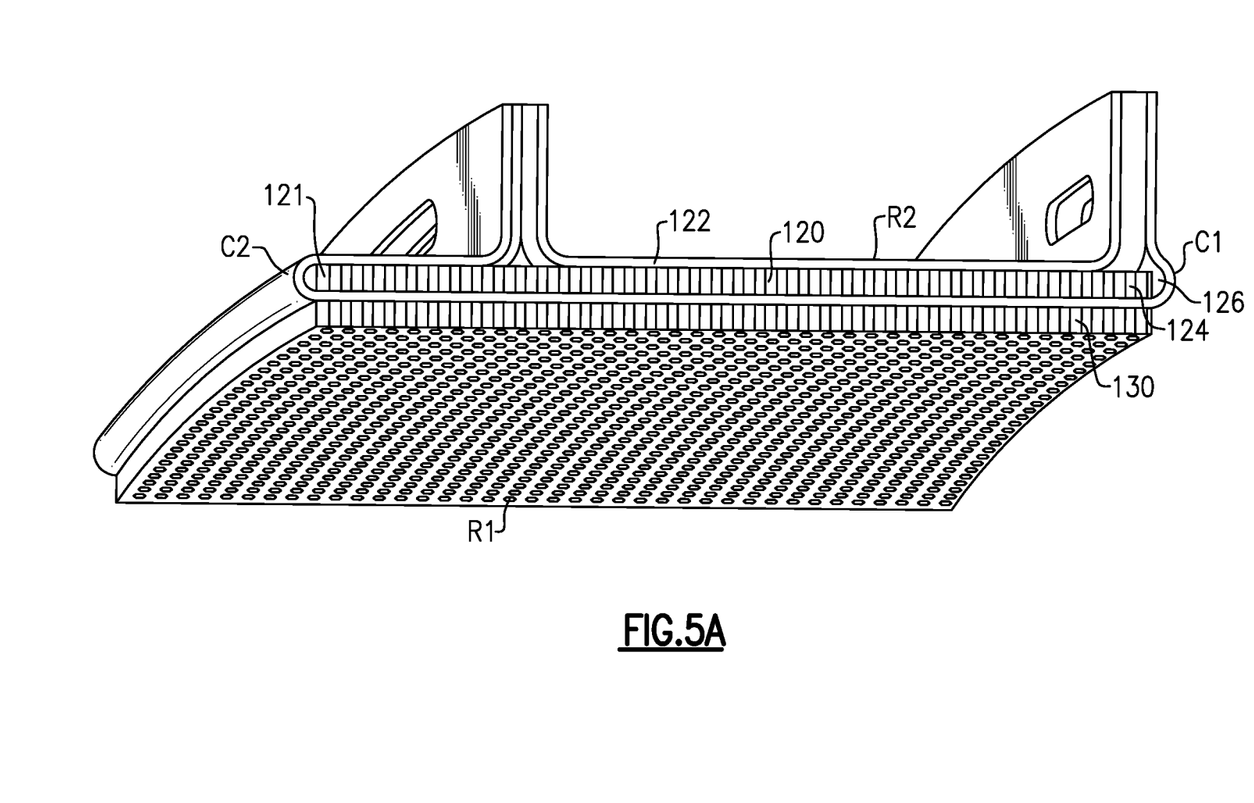
FIG. 5A shows a method step in forming a blade outer air seal.
Figure 5B:
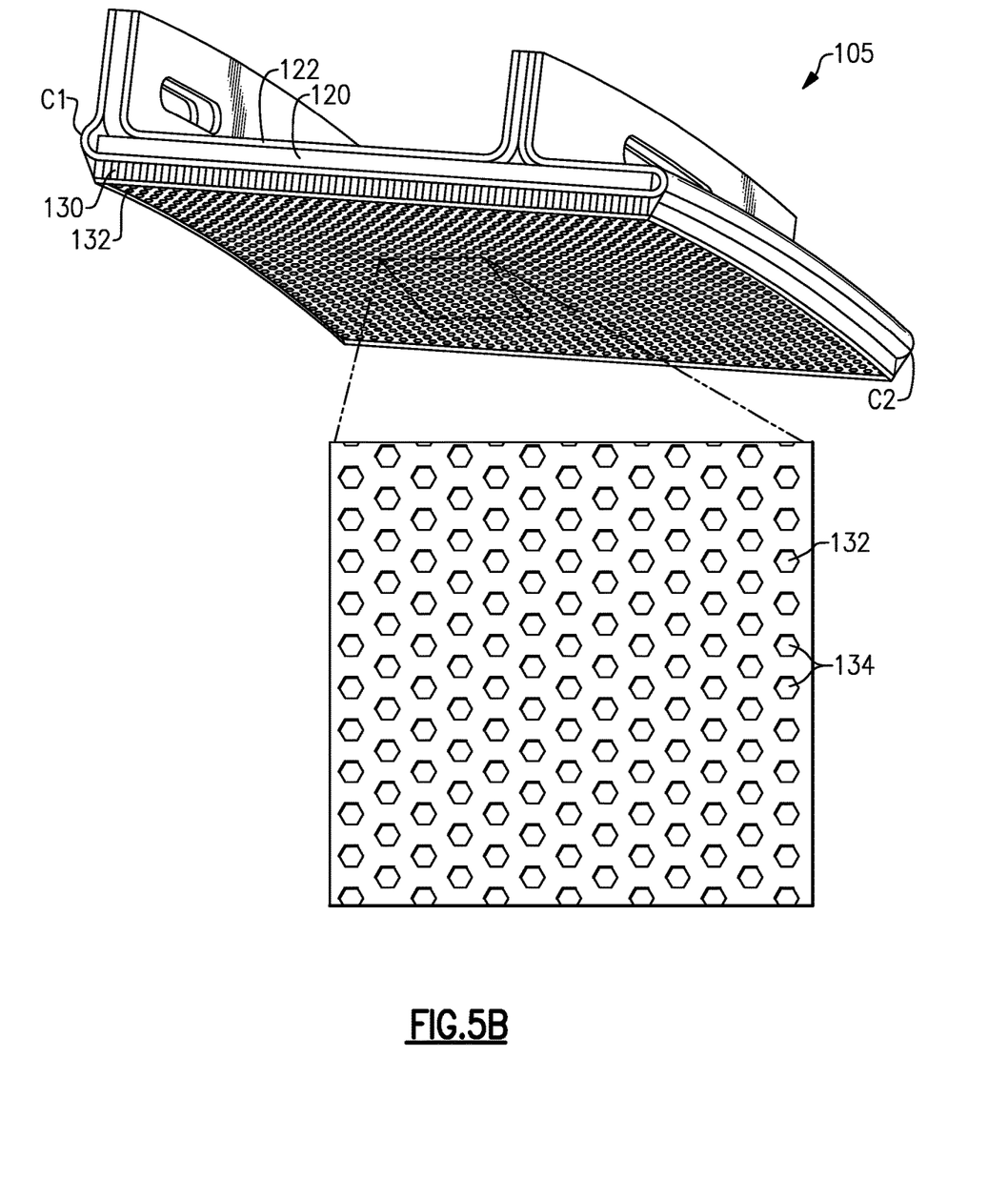
FIG. 5B shows a subsequent method step in forming a blade outer air seal.

FIGS. 5A and 5B show method steps of forming a BOAS seal segment 105. The BOAS seal segment 105 is formed of a ceramic matrix composite ("CMC") material. First, a seal body 121 is formed, such as from a plurality of laminates. In some embodiments, the seal body 121 is formed from a central reinforcement laminate 120 including a plurality of layers and an overwrap 122, which also includes a plurality of laminates. Next, a CMC honeycomb layer 130 is added to the radially inner side R1. The CMC honeycomb is 3D woven and produced in sheets. A CMC honeycomb sheet is then cut to size and applied to the radially inner side R1 of the seal body 121 to form the honeycomb layer 130, as shown in FIG. 5A. The seal body 121 and CMC honeycomb layer 130 are then densified. The CMC honeycomb layer 130 is densified onto the gaspath location on the BOAS seal segment 105.

A densification process is utilized to increase the density of the laminate material after forming the seal body 121. This makes the laminates more stiff than their free woven fiber state. During densification, materials, such as a silicon carbide matrix material, are injected into spaces between the fibers in the woven layers. Spaces 124 and 126 or the honeycomb layer 130 may be filled with loose fibers during densification, for example.

This densification process may be utilized to provide 100% of the desired densification, or only some percentage. As an example, the densification may be utilized to form between 10 and 90% of a desired densification. One hundred percent densification may be defined as the layers being completely saturated with the matrix and about the fibers. One hundred percent densification may be defined as the theoretical upper limit of layers being completely saturated with the matrix and about the fibers, such that no additional material may be deposited. In practice, 100% may be difficult to achieve in practice. This method of densifying the honeycomb layer 130 with the BOAS seal segment 105 allows the honeycomb layer 130 to act as an additional structural layer of the BOAS hotwall and no additional machining steps are necessary to create the cavities 134.

After the seal body 121 and CMC honeycomb layer 130 have been densified, the abradable coating 132 is applied. In some embodiments, the coating 132 is applied after all machining operations are completed on the seal segment 105. Individual cavities 134 of the honeycomb layer 130 are filled with the abradable coating, and additional abradable coating thickness 132 is applied on the radially inner side R1. The honeycomb layer 130 provides a base for the abradable coating to have GSAC properties.

Known methods of making a BOAS with a GSAC include drilling divots into the BOAS gaspath surface before applying the GSAC. The present disclosure eliminates the drilling step, by using a woven honeycomb sheet to form the honeycomb layer 130. Once the cavities 134 are filled with GSAC 132, additional GSAC thickness provides further environmental and thermal protection to the BOAS seal segment 105.

Figure 6A:
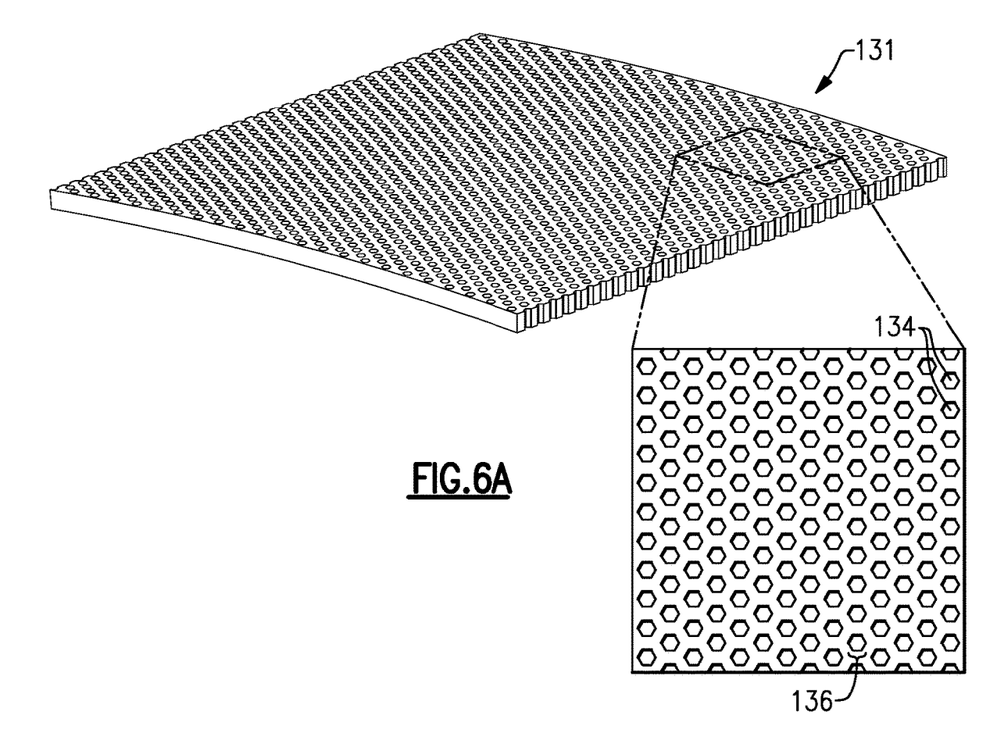
FIG. 6A shows a honeycomb sheet according to an exemplary embodiment.
Figure 6B:
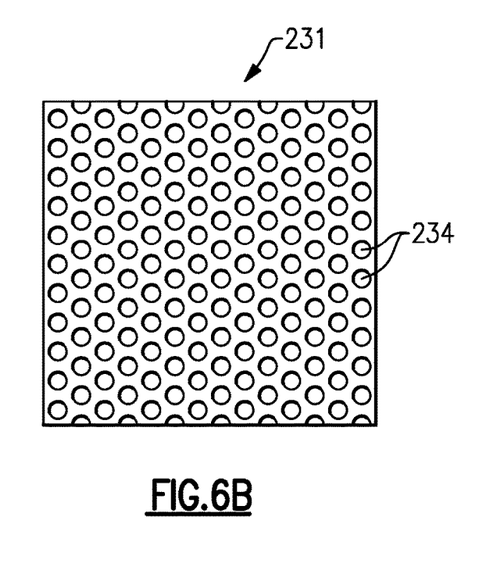
FIG. 6B shows a honeycomb sheet according to an exemplary embodiment.

The honeycomb layer 130 is initially formed as a continuous sheet. FIGS. 6A and 6B illustrate exemplary CMC honeycomb sheets 131. As shown in FIG. 6A, the honeycomb sheet 131 has a plurality of hexagonal cavities 134. The sheet 131 may be a silicon carbide sheet. In some examples, the sheet 131 is a carbon fiber reinforced silicon carbide composite. The sheet 131 may be 3D woven with the honeycomb structure, and may be adapted for chemical vapor infiltration. In other embodiments, the sheet 131 may be woven as a solid CMC sheet, with cavities 134 drilled in.

In some examples, each cavity 134 may have a width 136 of between about 0.010 and 0.200 inches (0.254-5.08 mm). In a further example, each cavity 134 has a width 136 of about 0.030 inches (0.762 mm). The sheet 131 may have a solidity of between about 20% and about 80%. In some examples, the sheet 131 has about 50% solidity. This means the about 50% of the area is solid structure, while 50% is cavities 134. However, greater or smaller solidities may be used. The hexagonal cavities 134 in the honeycomb sheet 131 may provide better spallation-mitigation properties than traditional machined circular divots, as there are additional faces for bonding of the GSAC 132.

FIG. 6B shows an alternative CMC sheet 231. In this example, the sheet 231 has a plurality of round cavities 234. In some embodiments, the CMC sheet 231 is a full continuous CMC sheet with cavities 234 drilled in. Circular cavities 234 may be easier to manufacture than hexagonal cavities, while still providing faults for segmentation of the GSAC 132. Other shaped cavities may also be used, such as rectangular or triangular, for example.

The honeycomb sheet is lightweight and structural, while providing cavities for insulation, cooling, or void space. The honeycomb structure may provide internal, film and/or perspiration cooling. The honeycomb sheet 131 provides a base for cracks to propagate with a lower risk of coating spallation. The honeycomb structure and GSAC coating may also provide a lower CMC bulk temperature.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal, comprising:
   a blade outer air seal body having a radially inner side and a radially outer side, wherein the radially inner side has a cavity layer having a plurality of cavities and an abradable coating over the cavity layer, wherein the plurality of cavities are evenly spaced over the entire cavity layer and wherein the cavity layer has a solidity between about 20% and about 80%.

2. The blade outer air seal of claim 1, wherein the plurality of cavities is a plurality of hexagonal cavities.

3. The blade outer air seal of claim 1, wherein the abradable coating fills each of the plurality of cavities.

4. The blade outer air seal of claim 1, wherein the seal body and the cavity layer are both a ceramic matrix composite material.

5. The blade outer air seal of claim 4, wherein the abradable coating is a geometrically segmented abradable coating formed from a ceramic material.

6. A method of forming a blade outer air seal, comprising:
   applying a cavity layer having a plurality of cavities to a radially inner side of a seal body, wherein the cavity layer is formed as a continuous sheet having the plurality of cavities and cut to size before being applied to the seal body, wherein the seal body and the cavity layer are a ceramic matrix composite material, wherein the continuous sheet is a 3D woven honeycomb sheet; and
   coating the cavity layer with an abradable coating.

7. The blade outer air seal of claim 1, wherein the cavity layer is formed from a 3D woven honeycomb sheet.

\* \* \* \* \*